United States Patent Office 2,860,140
Patented Nov. 11, 1958

2,860,140

STABILIZATION OF 2-METHYL-5-VINYLPYRIDINE

Clyde W. Mertz, Borger, Tex., assignor to Phillips Petroleum Company, a corporation of Delaware No Drawing. Application June 15, 1953
Serial No. 361,872

12 Claims. (Cl. 260—290)

This invention relates to a process for inhibiting proliferous type polymerization of polymerizable heterocyclic compounds having a hetero nitrogen atom. In one of its aspects, this invention relates to the inhibiting of proliferous polymerization of vinyl-substituted heterocyclic nitrogen compounds. In a further aspect this invention relates to the inhibiting of the formation of proliferous type polymers in vinylpyridine compounds.

The words inhibit and stabilize as used in this specification and the claims appended thereto are used to mean that the formation of popcorn polymer is materially reduced or prevented and do not imply any mechanism for accomplishing this purpose.

In the processing of 2-methyl-5-vinylpyridine, vinylpyridine, vinylsubstituted heterocyclic nitrogen compounds, and other alkene, alkadiene and alkyne substituted heterocyclic nitrogen compounds by various means, including distillation, polymerization occurs which manifests itself in two ways. Soluble polymers are formed which are evidenced by an increase is viscosity, and ultimately, by forming a solid mass. Also formed are insoluble polymers or proliferous polymers referred to in the trade and herein as popcorn polymers. The popcorn polymer is insoluble in the heterocyclic nitrogen compound and in other organic compounds, and when in contact with a monomer, it continues to grow. This problem is particularly acute in the manufacture and processing of vinyl-substituted pyridines obtained by the dehydrogenation of the corresponding ethyl substituted pyridines. Popcorn polymer accumulates or grows very rapidly in distillation processes, resulting in the loss of valuable material and causing pipes, condensers, and equipment to be clogged.

When 2-methyl-5-vinylpyridine (MVP) is made from 2-methyl-5-ethylpyridine (MEP) by dehydrogenation, the resulting mixture contains, besides the major constituents MVP and MEP, small amounts of picolines, divinylpyridines and some unidentified materials (probably other diolefin substituted pyridines) which initiate the proliferous type polymerization known to the art as popcorn polymers.

In accordance with this invention, for the purpose of overcoming difficulties due to popcorn polymer formation tendencies of these heterocyclic nitrogen compounds, it is proposed to add a novel inhibiting agent. I have discovered that readily polymerizable heterocyclic nitrogen compounds can be effectively inhibited from popcorn type polymerization during fractionation and storage by adding an organo-hydronitrogen compound. Said organo-hydronitrogen compound being an organic derivative of a parent hydronitrogen compound represented by the formula: $N_2H_x$ wherein $x$ is limited to the values 2 and 4. Although all of the organo-hydronitrogen compounds which I have tried have proved to be effective inhibitors of popcorn polymer formation implying that this general class of compounds ($N_2R_x$, wherein R is an organic substituent and $x$ is 2 or 4) will all be found to be effective inhibitors of popcorn polymer formation. However for the purposes of this disclosure and the appended claims the term organo- will be used in the limited sense which will now be described.

Chemically the general formula $N_2R_x$ points out the remarkable similarity of these compounds as inhibitors of popcorn polymer formation, but for purposes of nomenclature, I find it advisable to divide the organo-hydronitrogen compounds of this invention into the better known classification: azo compounds, hydrazo compounds, azoxy compounds and hydrazono compounds. These compounds may be represented by the formulas:

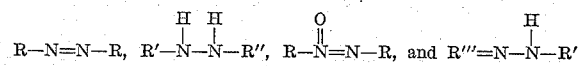

wherein R is phenyl; R' may be phenyl, acyl, alkyl or cycloalkyl; R" may be hydrogen or phenyl and R'" may be alkylidene, hydroxy-alkylidene, phenylalkylidene or phenyl hydroxy alkylidene. Wherever phenyl is indicated, substituted phenyls are also implied wherein the substituents may be selected from the groups: alkyl alkoxy, carboalkoxy, hydroxy, ketonyl, acyl or thio derivatives of these groups. The number of carbon atoms in a substituted group will be limited to a maximum of 16. The hydrochlorides of the hydrazo compounds are also effective.

Examples of the organo-nitrogen compounds of my invention are: phenyl hydrazine, phenyl hydrazine hydrochloride, N,N'-diphenyl hydrazine, dithio-4-carbethoxyphenyl hydrazine, p,p'-dithio-N,N'-phenolhydrazine, hydrazotoluene, hydrazophenetole, hydrazo-4,4'-thioacetonylbenzene, butyrylhydrazine (hydroxybutylidenehydrazine), 3-acetyl-3'-thioacetyl-N,N'-diphenylhydrazine, azobenzene, azotoluene, azophenol, azo-p,p'-thiophenol, 4,4'-dithiocarbethoxy azobenzene, p,p'-azophenetole, N-cyclohexyl - N' - phenylhydrazine, p - phenyl - azoacetanilide, o-phenylazoaniline, m-phenylazoaniline, p - phenylazoaniline, 4-amino-2,3'-dimethyl-azobenzene, 4-amino-3,4'-dimethylazobenzene, 2,2'-diaminoazobenzene, azobenzoic acid, dimethylaminoazobenzene, azonaphthalene azoxybenzene, azoxynaphthalene, hydrazobenzoic acid, hydrazonaphthalene, benzoyl hydrazine, benzil-hydrazine, ethylhydrazine, ethyl-phenyl hydrazine, methyl hydrazine, methyl phenyl hydrazine, tolyl hydrazine, xylylhydrazine, isopropylhydrazine, butyrylaldehydephenylhydrazone, acetone phenylhydrazone, acetic hydrazone, propanoic hydrazone, azoxytoluene, azoxyphenetole, azoxythiophenol, azoxythiobenzoic acid, azoxythio-β-naphthol, (p,p'-dinitro)-azobenzene.

The polymerization which is inhibited by the novel stabilizing agents disclosed herein is primarily that which forms an insoluble, hard, porous and opaque material often referred to as popcorn polymer. However, polymers are also formed which are soluble in the heterocyclic nitrogen reactants and which become apparent by an increase in viscosity. As is seen from the examples, soluble polymer formation is also retarded by the disclosed organo-hydronitrogen compounds.

One group of polymerizable heterocyclic nitrogen compounds which can be inhibited in accordance with my invention comprises the mono- and divinylpyridines, with the vinyl group being present in any of the several positions in the pyridine ring. Alkyl groups can be present on the ring, or on the alpha carbon atom of the vinyl group, but the number of carbon atoms in the combined alkyl groups should generally not be greater than 12. These alkyl groups are preferably methyl and ethyl groups. Substituents attached to carbon atoms in the ring can be selected from the group consisting of hydrogen, alkyl, vinyl, and isopropenyl (alpha-methylvinyl) groups; at least one and not more than two of said groups being vinyl or alpha-methylvinyl; and the total number of carbon atoms in the alkyl groups being not greater than 12. Examples of such compounds are 2-vinylpyridine; 3-vinylpyridine; 4-vinylpyridine; trimethyl-5-vinylpyridine; 3,4,5,6 - tetramethyl-2-vinylpyridine; 3-ethyl-5-vinylpyridine; 2,6-diethyl-4-vinylpyridine; 2-isopropyl-4-nonyl - 5 - vinylpyridine; 2 - methyl-5-undecyl-6-vinylpyridine; 3-dodecyl-4,2-divinylpyridine; 2,4-dimethyl-5,6-diphenyl-3-vinylpyridine; 3,5 - di(alpha-methylvinyl)pyridine; similar mono and di substituted alkene, alkadiene, and alkyne pyridines.

Other polymerizable heterocyclic compounds containing a hetero nitrogen atom included within the scope of this invention are those vinyl and alpha-methylvinyl substituted heterocyclic nitrogen compounds in which the ring structure is unsaturated, partially saturated, and completely saturated. Examples include alkene, alkadiene, and alkyne substituted quinolines, isoquinolines, piperidines (hexahydropyridines), pyrroles, pyrrolidines, pyrrolidones, alkyl derivatives of the foregoing compounds dihydro and tetrahydropyridines, partially hydrogenated quinolines, isoquinolines, and pyrrolines (dihydropyrroles). Of special importance are the vinyl and alphamethylvinyl substituents of these heterocyclic nitrogen compounds examples of which are 2-vinylquinoline; 8-ethyl-2-vinylquinoline; 4-hexyl-5-vinylquinoline; 1-vinylisoquinoline; 5-methyl-1-isopropenylisoquinoline; 1,8-divinylisoquinoline; vinylpyrrolidone; vinylpyrrole; vinylpiperidine; and vinylpyrrolidine and the like. Normally the alkene, alkadiene or alkyne substituents will be attached to a ring carbon atom. However, in compounds wherein the ring nitrogen atom is a secondary nitrogen atom, the vinyl group can be attached to this ring nitrogen atom, for example N-vinylcarbazole and N-vinylpyrrolidone. The process of this invention is particularly applicable to organic or hydrocarbon mixtures containing a substantial proportion of a vinylpyridine compound. Examples of vinylpyridine compounds contained in such mixtures are 2-vinyl-4,6-dimethylpyridine, 2-methyl-4-vinylpyridine, 2-methyl-5-vinylpyridine, 5-ethyl-2-vinylpyridine, 5-amyl-2-vinylpyridine. The heterocyclic compound containing a hetero nitrogen atom of particular commercial importance at the present time is 2-methyl-5-vinylpyridine (MVP).

In carrying out the invention, solution of the inhibiting agent in the heterocyclic nitrogen compound can be accomplished in any suitable manner. The concentration of the organo-hydronitrogen compound to be used will depend upon numerous factors such as temperature, time, and economic considerations. In practice a range of concentrations of 0.01 percent to 5.0 percent by weight of the azo compound will be employed, all percentages being based on the weight of the heterocyclic nitrogen compound being inhibited. Also, the amount will depend on the particular heterocyclic nitrogen compound concerned, and, as will be apparent from the following examples, upon the particular organo-hydronitrogen compound being utilized.

*Example I*

A mixture comprising approximately 95 weight percent of 2-methyl-5-vinylpyridine, and the balance being comprised of 2-methyl-5-ethylpyridine, divinylpyridine, dimethylpyridine, picolines, and the like as obtained from a dehydrogenation plant was vacuum flashed at less than 50 mms. mercury pressure and 200° F. in a laboratory distillation column. The bottoms product containing a large percentage of divinylpyridine was recovered for use as a polymer initiator.

Approximately one percent, based on the weight of the monomer mixture being initiated, of the bottoms product from the laboratory still was added to some of the 95 percent MVP material along with a small seed of popcorn polymer. Unless the bottoms product was used as an initiator, the behavior of the seeded product was unpredictable, it taking 24 to 48 hours or longer for the complete formation of popcorn polymer. In every case where the initiator material was added, the seeded monomer was completely converted to popcorn polymer in 10 hours or less.

The mixture of 95 percent MVP material, initiator, and seed was stored at 190° F. for the 12 days with the results as shown as follows:

| Material | Observation |
| --- | --- |
| (1) Control*, no inhibitor | All popcorn in about 9 hours. |
| (2) (1) plus 0.2 wt. percent azobenzene | No popcorn, fluid after 12 days. |
| (3) (1) plus 0.5 wt. percent azobenzene | Do. |
| (4) (1) plus 0.2 wt. percent azoxybenzene | All popcorn in 26 hours. |
| (5) (1) plus 0.5 wt. percent azoxybenzene | Almost solid but no popcorn in 12 days. |
| (6) (1) plus 0.5 wt. percent butyrylhydrazine | Slightly viscous but no popcorn in 12 days. |
| (7) (1) plus 0.2 wt. percent phenylhydrazine | Slightly viscous in 4 days, almost solid in 12 days. |
| (8) (1) plus 0.5 wt. percent phenylhydrazine | Fluid, no popcorn polymer in 12 days. |
| (9) (1) plus 0.2 wt. percent phenylhydrazine hydrochloride | Do. |
| (10) (1) plus 0.5 wt. percent phenylhydrazine hydrochloride | Do. |
| (11) (1) plus 0.2 wt. percent hydrazobenzene | Do. |
| (12) (1) plus 0.5 wt. percent hydrazobenzene | Do. |

*Control was 95 percent MVP plus 1 percent initiator and a popcorn seed.

From the foregoing it is apparent that organo-hydronitrogen compounds are effective inhibitors of popcorn, or proliferous polymer, formation when heterocyclic compounds having a hetero nitrogen atom are maintained at elevated temperature, and most remarkably, even when the test solutions are seeded to make the test conditions more severe.

This invention accordingly concerns a method for treating polymerizable heterocyclic nitrogen compounds with organo-hydronitrogen compounds up to 400° F. as well as at room temperatures or below. In accordance with this invention organic mixtures containing polymerizable heterocyclic nitrogen compounds mixed with other heterocyclic nitrogen compounds, or purified polymerizable heterocyclic nitrogen compounds, can be stored over long periods of time preferably at room temperature. Also, when it is desired to separate a particular heterocyclic nitrogen compound from other organic compounds, the inhibited soulition can be distilled, preferably at reduced pressure, without any substantial loss of product, the organo-hydronitrogen compound serving to inhibit polymerization during the process. The instant invention is particularly applicable to mixtures of heterocyclic compounds having a heteronitrogen atom, containing a substantial proportion of at least one vinyl-substituted heterocyclic compound having a heteronitrogen atom, i. e., sufficient to cause difficulty due to polymer formation during storage and distillation.

In the practice of this invention the polymer inhibiting agents disclosed herein can be used, for example, in the following manner. In the preparation of 2-methyl-5-vinylpyridine from 2-methyl-5-ethylpyridine by dehydrogenation, the principal separation is a combined steam and vacuum distillation to make a separation between the MVP and the MEP. Because of the proximity of the boiling points of the stated components, this is a difficult separation to make, and the high boiling temperatures of the components requires that the fractionation be accomplished at high temperature. Thus, during the distillation the methylvinyl pyridine is maintained at high temperatures for a long time interval, and considerable polymerization of the MVP occurs, and consequently, after a short period of time, operation of the column becomes impossible due to insoluble polymer formation in the lower part of the fractionation column and in the kettle. However, by the use of organo-hydronitrogen compounds in accordance with this invention, shutdowns due to the formation of insoluble polymers can be largely eliminated. The organo-hydronitrogen compound can be added directly to the feed of the distillation column or it may be added to the reflux of said column or a combination of the two. The amount of organo-hydronitrogen compound to be used may vary from 0.1 to 5.0 percent by weight based on the weight of the heterocyclic nitrogen compound. I prefer to use between 0.5 and 1.0 percent inhibitor.

It will be understood that the foregoing disclosure is by way of illustration only and that other embodiments within the scope of the invention will occur to those skilled in the art. Those in the art will appreciate, for instance, that for the purpose of this invention, alkene, alkadiene, and alkyne substituted heterocyclic compounds having a heteronitrogen atom and further substituted with non-interfering groups, for example, halo-, nitro-, amino-, hydroxy-, and carboxy-, are considered the equivalent of alkene, alkadiene, and alkyne heterocyclic nitrogen compounds not so substituted.

I claim:

1. A method which comprises stabilizing 2-methyl-5-vinylpyridine by treating said material with azobenzene in an amount sufficient to inhibit proliferous polymerization.

2. A method which comprises stabilizing 2-methyl-5-vinylpyridine by treating said material with phenylhydrazine in an amount sufficient to inhibit proliferous polymerization.

3. A method which comprises stabilizing 2-methyl-5-vinylpyridine by treating said material with phenylhydrazine hydrochloride in an amount sufficient to inhibit proliferous polymerization.

4. A method which comprises stabilizing 2-methyl-5-vinylpyridine by treating said material with butyrylhydrazine in an amount sufficient to inhibit proliferous polymerization.

5. A method which comprises stabilizing 2-methyl-5-vinylpyridine by treating said material with azoxybenzene in an amount sufficient to inhibit proliferous polymerization.

6. A composition containing 2-methyl-5-vinylpyridine stabilized against proliferous polymer formation having incorporated therein a stabilizing amount of azobenzene.

7. A composition containing 2-methyl-5-vinylpyridine stabilized against proliferous polymer formation having incorporated therein a stabilizing amount of phenylhydrazine.

8. A composition containing 2-methyl-5-vinylpyridine stabilized against proliferous polymer formation having incorporated therein a stabilizing amount of phenylhydrazine hydrochloride.

9. A composition containing 2-methyl-5-vinylpyridine stabilized against proliferous polymer formation having incorporated therein a stabilizing amount of butyrylhydrazine.

10. A composition containing 2-methyl-5-vinylpyridine stabilized against proliferous polymer formation having incorporated therein a stabilizing amount of azoxybenzene.

11. A method of stabilizing 2-methyl-5-vinylpyridine against proliferous polymer formation which comprises adding thereto 0.01–5 weight percent based on said compound of at least one compound selected from the group consisting of azobenzene, phenylhydrazine, phenylhydrazine hydrochloride, butyrylhydrazine, and azoxybenzene.

12. A composition containing 2-methyl-5-vinylpyridine stabilized against proliferous polymer formation having incorporated therein 0.01–5 weight percent based on said compound of at least one compound selected from the group consisting of azobenzene, phenylhydrazine, phenylhydrazine hydrochloride, butyrylhydrazine, and azoxybenzene.

References Cited in the file of this patent

UNITED STATES PATENTS

| | | |
|---|---|---|
| 2,570,269 | Parker | Oct. 9, 1951 |
| 2,600,457 | Wynstra | June 17, 1952 |

OTHER REFERENCES

Kluchesky et al.: Industrial and Engineering Chemistry, vol. 41, Number 8, pages 1768–1771.

Frank et al.: Journal of the American Chemical Society, vol. 68, page 908, 1946.

Kharasch et al.: Industrial and Engineering Chemistry, vol. 39, pages 830–837, 1947.

Schulz et al.: Chemische Berichte, vol. 80, pages 232–242, cited in Chemical Abstracts, vol. 42, column 4960 (i), 1947.

Salomon et al.: Journal of Polymer Science, vol. 4, pages 203–214, 1949.

UNITED STATES PATENT OFFICE
Certificate of Correction

Patent No. 2,860,140                                              November 11, 1958

Clyde W. Mertz

It is hereby certified that error appears in the printed specification of the above numbered patent requiring correction and that the said Letters Patent should read as corrected below.

Column 2, lines 12, 13, and 14, for the right-hand portion of the formula reading

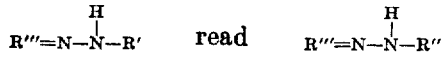

column 3, line 19, after "pounds" insert a comma; column 4, line 45, for "souliton" read —solution—; line 55, after "polymer" insert —formation—.

Signed and sealed this 16th day of June 1959.

[SEAL]

Attest:
KARL H. AXLINE,
*Attesting Officer.*

ROBERT C. WATSON,
                                                  *Commissioner of Patents.*